United States Patent
Burnett

[15] 3,691,617
[45] Sept. 19, 1972

[54] METHOD OF LINING PIPE FITTINGS AND LIKE ARTICLES

[72] Inventor: Edward L. Burnett, Bay City, Mich. 48706

[73] Assignee: The Dow Chemical Company, Midland, Mich.

[22] Filed: June 29, 1970

[21] Appl. No.: 50,858

[52] U.S. Cl. ................29/423, 29/234, 29/235, 29/451, 29/525, 285/55
[51] Int. Cl. .............................................B23p 17/00
[58] Field of Search....29/157 A, 423, 451, 234, 235, 29/525; 285/55

[56] References Cited

UNITED STATES PATENTS

| | | |
|---|---|---|
| 610,726 | 9/1898 | Ruete...................29/423 UX |
| 1,016,770 | 2/1912 | Persons.................29/423 X |
| 1,574,551 | 2/1926 | Bumford...............29/423 UX |
| 1,943,560 | 1/1934 | Squires.................29/423 UX |
| 1,978,452 | 10/1934 | Flodin....................29/157 A |
| 2,293,426 | 8/1942 | Coberly..................29/234 X |
| 2,435,904 | 2/1948 | Robaus...................29/157 A |
| 3,462,825 | 8/1969 | Pope et al...................29/451 |

Primary Examiner—Charlie T. Moon
Attorney—Griswod & Burdick, Richard G. Waterman and Robert B. Ingraham

[57] ABSTRACT

A plastic tube is filled with a material having a low compressive strength. The plastic tube is then forced into a cavity which is to be lined, such as a pipe fitting. The low strength filler material prevents collapse and deformation of the tube as it conforms to the cavity being lined.

7 Claims, 1 Drawing Figure

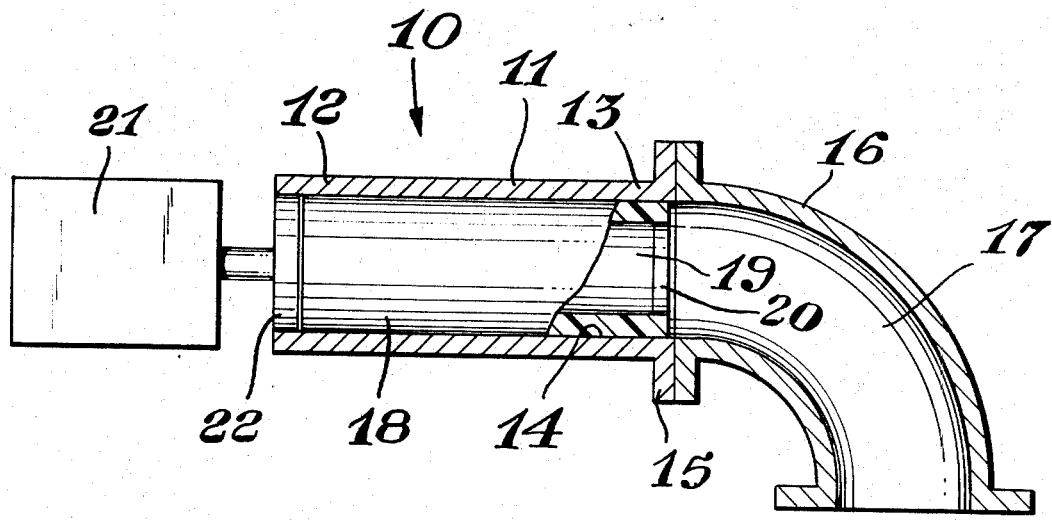

METHOD OF LINING PIPE FITTINGS AND LIKE ARTICLES

Various cavities have been lined with plastic materials by molding in place, molding a plastic material and subsequently installing the molding within the cavity, coating and like techniques. Generally, if linings of significant thickness are required; that is, thicker than those obtained by normal coating techniques such as are required in many applications for plastic lined piping, the fabrication of pipe fittings such as reducers, reducing elbows, 90° elbows, 45° elbows, return bends and the like can require a wide variety of molds and molding conditions to give the desired plastic protection to the surface of the fitting which would otherwise be exposed to flow therein.

It would be desirable if there were available an improved method for lining cavities such as pipe fittings which would not require expensive molds and significantly diverse conditions for different varieties of fittings.

Furthermore, it would be desirable if such cavities could be lined employing a simple, generally linear extruded shape such as a cylindrical conduit.

It would be further desirable if such a method were relatively flexible with regard to diverse fittings.

These benefits and other advantages in accordance with the present invention are achieved in a method for the lining of a body defining a cavity, the steps of the method comprising providing a body, the body defining an internal cavity extending to an exposed surface of the body, providing in mating relationship to the exposed surface of the body a restraining means, the restraining means adapted to generally mate with the opening in the body, disposing within the restraining means a hollow plastic body with which it is desired to line the first body, disposing within the hollow plastic body a generally non-compressible solid deformable material, applying force to the filled plastic body remote from the body to be lined, the force being sufficient to insert the plastic body into the cavity to be lined and deform the deformable material therein.

Further features and advantages of the present invention will become more apparent from the following specification taken in connection with the drawing wherein the FIG. schematically depicts a sectional view of an apparatus generally designated by the reference numeral 10 particularly suited for practice of the present invention. The apparatus 10 comprises a restraining means or hollow cylindrical sleeve 11 having an inlet end 12 and a discharge end 13. The sleeve 11 defines a hollow cylindrical passageway 14 extending from the inlet or first end 12 to the discharge or outlet end 13. A securing means or flange 15 is affixed to the discharge end 13 and is adapted to mate with a fitting to be lined. An unlined fitting or elbow 16 is shown in operative engagement with the flange 15. The fitting 16 has an internal passageway 17. A hollow generally cylindrical synthetic resinous body 18 is disposed within the passageway 14 of the sleeve 11. The plastic sleeve 11 is of a lining material desired to be disposed within the passage 17 of the body or fitting 18. Within the hollow tubular body 18 is disposed a filler of low compressive strength 19 such as mortar, plaster of Paris or the like. A plug 20 is disposed within the plastic body 18 generally adjacent the discharge end 13 of the tube 11. A forcing means 21 is disposed generally adjacent the end 12 of the sleeve 11. The forcing means 21 has a piston 22. The piston 22 engages the hollow plastic body 18 and the low strength filler 19.

In the practice of the present invention in accordance with the Figure, the low strength material is restrained within the plastic cylinder 18 by means of a plug such as the plug 20 or by virtue of the fact that the plug is of a hardenable material such as plaster of Paris, cement or the like. When the passageways, such as the passageways 14 and 17 are in alignment, the forcing means 21 applies a force to the hollow cylinder 18 and forces the cylinder 18 together with the filler material into the fitting being lined. The presence of the filler material prevents collapse and buckling of the liner as it is inserted into the fitting. If a particulate material such as sand is employed for the low strength filler, deformation occurs, whereas if a rigid filler such as cement or plaster of Paris is used, rupture of the filler occurs without significant tendency of the liner to collapse as it is deformed within the fitting. The filler for the liner is particulate, generally non-compressible material or one which becomes particulate on distortion, such as plaster of Paris, bonded foundry sand and the like.

As depicted in the Figure, a fitting of more or less constant diameter is shown. However, tapering fittings, such as reducers and reducing elbows, are also eminently satisfactory. It is desirable that when lining a reducing fitting, the liner be inserted in the larger or largest opening of the fitting. The plastic lining, after being inserted to a desired depth within the fitting, and subsequent removal of the particulate or ruptured filler material, is then cleansed of the filler material and suitable connections or flanges formed on the ends of the fitting.

A wide variety of flanging techniques are well known in the art, some of which are set forth in the following U.S. Pat. Nos. 2,823,418; 3,020,068; 3,042,965; 3,284,107; 3,284,108; 3,341,894 and 3,383,750.

A wide variety of thermoplastic resinous compositions are useful in the practice of the present invention, including polyperfluorocarbons such as polytetrafluoroethylene, polychlorotrifluoroethylene, polyhalohydrocarbons such as polyvinylfluoride; vinylidene chloride polymers such as sarans, vinylidene chloride-ethyl acrylate copolymers; polyvinyl chloride; polyolefins such as polypropylene, polyethylene, resinous polymers of ethylene and propylene; nylon 6, nylon 66, nylon 7 and the like; alkenyl aromatic polymers including styrene polymers such as rubber-modified polystyrene, styrene-acrylonitrile; polyethers such as polymers of 2,2-bis(chloromethyl)oxacyclobutane and the like.

The essential characteristic of the lining to be operable in the present process is that it be deformable at a temperature below its softening temperature; that is, capable of viscoelastic deformation at a temperature between the glass of brittle temperature and the softening temperature. This phenomenon is found in most of the materials referred to as plastics which have not been cross-linked to a point where heat softening can no longer occur.

As the flow phenomenon is temperature and time dependent, more rapid sizing or reduction of the liner may be done at temperatures near the softening temperature, whereas the same amount of deformation may be induced in the liner at a temperature slightly above the glass or brittle temperature over a much longer period of time. The recovery or expansion of the compressed liner similarly is time dependent, longer times being required as the temperature approaches the glass temperature and shorter time periods required as the temperature approaches the softening temperature.

With many synthetic resins, the glass temperature is below normal ambient temperature and the softening temperature is well above ambient temperature. Some plastics of this nature are some saran compositions, rubber-modified polystyrene, the so-called "impact" grade polystyrene, polypropylene, resinous polymers of ethylene and propylene, nylon 66, etc.

One particularly beneficial plastic material which may be used in the practice of the present invention is polytetrafluoroethylene. In lining reducing fittings in accordance with the present invention, advantageously the linings may be of more than one size of plastic tubing. Thus, the larger portion of the fitting may be lined with a larger tube and a smaller tube employed to complete the lining of the smaller portion of the fitting. The two liner portions should, of course, overlap to provide desired protection of the fitting from material flowing within fitting. When employing polytetrafluoroethylene as a liner at ambient temperature, usually the polytetrafluoroethylene should be pushed into the fitting at a relatively low speed, such as from about one-fourth to 1 inch per minute, and beneficially at a rate of about one-half inch per minute. If it is desired to use more rapid lining speeds, higher temperatures may be employed.

In order to obtain maximum rigidity between the liner and the segment to be lined, it is advantageous to radially compress a lining member at a temperature above its glass temperature and below the softening temperature until the compressed lining tube will enter the fitting to be lined; that is, employ an oversize tube and mechanically reduce the diameter by radial compression, such as by forcing the tube through a frustoconical die to reduce its diameter. Due to the nature of the tube, the so-called memory of the plastic will cause gradual expansion. Such an expansion increases in rate as the temperature of the polymer is raised toward the softening point and decreases in rate as the temperature approaches the glass temperature.

Fittings having a lining which are most resistant to mechanical displacement beneficially are prepared by initially reducing the diameter of the lining until the lining material will enter the fitting to be lined, positioning the lining within the fitting in the manner hereinbefore described and aging the lining at a temperature adjacent to, but below, the softening temperature. For example: a fitting having an interior passageway having a diameter of 2 inches is lined by employing a plastic tube such as polytetrafluoroethylene having an outside diameter of 2.2 inches by passing the unsupported tube through a tapering die having a minimal diameter of 1.8 inches to obtain a tube having a diameter of about 1.95 inches. A desired length of the tube having a diameter of 1.95 inches is filled with a suitable support material, such as plaster of Paris. The supported liner (tube containing plaster of Paris) is then forced into the fitting, deforming the polytetrafluoroethylene. The liner is heated at a temperature of about 250° F. in order to remove excess moisture from the filler material. A period of about 16 hours is usually sufficient to remove excess water. The fitting is subsequently heated to about 560° F. for a period of about 4 hours. The plastic memory of the polytetrafluoroethylene causes the liner to expand and engage the inner face of the lined fitting. Either before or after cooling to ambient temperature, the plaster of Paris is removed from the lined fitting and the ends of the liner finished in a desired manner, such as by flanging.

By way of further illustration, a nominal 2 inch 90°-flanged elbow fitting is connected at one end to a long flanged welding neck bored out to provide a slip fit on a polytetrafluoroethylene tube having a 2¼ inch outside diameter and 2 inch inside diameter. The liner is provided with a rubber stopper at one end, filled with a plaster of Paris-water mixture. When the plaster of Paris mixture is set, the filled tube is heated to 250° F. to remove excess water. The tube is then positioned within the welding neck. A ram is positioned on the tube and the liner pushed into the elbow fitting to a distance sufficient to provide enough protruding liner to permit flange formation. The lined fitting is then placed in an air oven at a temperature of 570° F. for a period of 2 hours. Upon removal of the fitting from the oven, the hardened plaster of Paris is removed from the interior and the projecting portions of the liner flanged. The liner is tightly positioned within the fitting and shows no evidence of collapse. The fitting is fitted with a blind flange at one end and connected to a vacuum system maintained at 500° F. for 180 hours and under a vacuum of 29 inches of mercury. Little tendency of the liner to collapse is observed.

In a manner similar to the foregoing illustration, a 2 inch to 1½ inch reducer is lined. However, the rubber stopper is removed prior to forcing the plaster-filled lining material into the fitting. The lining so-formed operates satisfactorily in all respects. Other fittings which are readily lined in accordance with the present invention include 45° elbows, reducing elbows, off-set reducers and return bends. Satisfactory operation is obtained when plaster of Paris is replaced with sand having a sodium silicate binder, sand with a phenolformaldehyde binder, portland cement and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

I claim:

1. A method for the lining of a body defining a cavity, the steps of the method comprising
providing a body, the body defining an internal curved cavity extending to an exposed surface of the body,
providing in mating relationship to an exposed surface of the body a restraining means, the restraining means adapted to generally mate with the opening in the body, disposing within the restraining means a hollow plastic body with which it is desired to line the first body, the hollow plastic body having a generally non-compressible solid deformable material therein, applying force to the filled plastic body remote from the body to be lined, the force being sufficient to push the plastic body from the restraining means and into the cavity to be lined and to form the deformable material therein, and subsequently removing the deformable material therefrom.

2. The method of claim 1 including the step of providing the hollow plastic body with a diameter greater than that of the cavity to be lined and reducing the diameter of the hollow plastic body to a diameter which will slide within the cavity.

3. The method of claim 2 wherein the diameter of the hollow plastic body is reduced by deforming in a radially inward direction.

4. The method of claim 1 wherein the non-compressible solid formable material is plaster.

5. The method of claim 1 wherein the body is an elbow pipe fitting.

6. The method of claim 1 wherein the hollow plastic body is polytetrafluoroethylene.

7. A method for the lining of a hollow pipe fitting, the pipe fitting having a body, the body having an internal curved cavity extending therethrough, the body having a first opening and a second opening, providing in mating relationship with the first opening of the body a restraining means, the restraining means adapted to mate with the first opening in the body, providing within the restraining means a generally hollow cylindrical plastic liner member with which it is desired to line a fitting, the liner member having a generally non-compressible solid deformable material therein, pushing the liner and non-compressible material from the restraining means and into the fitting, and subsequently removing the deformable material therefrom.

* * * * *